United States Patent Office 2,917,359
Patented Dec. 15, 1959

2,917,359

SEPARATION OF FISSION PRODUCT VALUES FROM HEXAVALENT PLUTONIUM BY CARRIER PRECIPITATION

Thomas Harrison Davies, Chicago, Ill., assignor to the United States of America as represented by the United States Atomic Energy Commission No Drawing. Application November 16, 1951
Serial No. 256,837

9 Claims. (Cl. 23—14.5)

This invention deals with the recovery of the so-called fission product values and/or of plutonium values from aqueous mineral acid solutions containing plutonium together with fission product values and/or with uranium values, and the invention deals particularly with the recovery of the fission product values and/or the plutonium values by a carrier precipitation process.

It is known that natural uranium, when bombarded with slow neutrons, forms $Pu^{239}$ and elements having atomic numbers between 30 and 64, the so-called fission products. The fission products emit harmful gamma rays and thus "contaminate" the plutonium. For this reason, it is advantageous to separate the fission product values from the plutonium or to decontaminate the plutonium. The recovery of the fission product values, moreover, is frequently desirable per se since they are being used nowadays for many scientific and industrial purposes, for instance for medical studies and applications.

It is an object of this invention to provide a process for the separation of fission product values from plutonium values in a simple, economic and highly efficient manner.

It is another object of this invention to provide a process for the recovery of fission product values from solutions containing them in admixture with plutonium values whereby a satisfactory yield is obtained without the necessity of a repetition of the process cycle.

For the purpose of processing it, neutron-irradiated uranium is usually first dissolved in mineral acid, for instance in nitric acid. The so-called dissolver solutions obtained thereby contain predominantly uranium and also plutonium and fission products in, however, very low relative and absolute concentrations, which makes the quantitative recovery of the fission products as well as that of the plutonium difficult. For instance, precipitation of these values in the form of insoluble compounds is either impossible or highly unsatisfactory, because these elements are usually present in such small quantities that, even when converted to such "insoluble" compounds, they are still within the range of solubility. For this reason one has resorted to the so-called carrier precipitation which comprises providing the presence of macro-quantities of a foreign insoluble compound which entrains or "carries" the "insoluble" compounds of plutonium and/or fission products.

There are a great number of carriers usable for the separation of fission products and/or plutonium from aqueous mineral acid solutions. The following are representative examples of useful carriers:

| | |
|---|---|
| $BiPO_4$ | $Ce(IO_3)_4$ |
| $BiAsO_4$ | $Ce_3(PO_4)_4$ |
| $Bi(OH)_3$ | $ZrO(IO_3)_2$ |
| $Bi_2(C_2O_4)_3$ | $Zr(OH)_4$ |
| $LaF_3$ | $BaCrO_4$ |
| $LaPO_4$ | $PbCrO_4$ |
| $La(OH)_3$ | $Al(OH)_3$ |
| $La_2(C_2O_4)_3$ | $Fe(OH)_3$ |
| $La_2(SO_4)_3 \cdot K_2SO_4$ | $Cu(OH)_2$ |
| $ThF_4$ | $Cb_2O_5$ |
| $Th(IO_3)_4$ | $U(C_2O_4)_2$ |
| $Th(C_2O_4)_2$ | $U(IO_3)_4$ |
| $Th(SO_4)_2 \cdot 2K_2SO_4$ | $UP_2O_6$ |
| $CeF_3$ | $UO_4$ |
| $CeF_4$ | $NaUO_2(C_2H_3O_2)_3$ |
| $CePO_4$ | $NaMg[UO_2(C_2H_3O_2)_3]_3$ |

These carriers can be added as preformed precipitates, or they can be formed in the solution by adding a soluble substance containing the anion and a soluble substance containing the cation of the carrier. The latter method is preferred.

While the invention is applicable to processes using any of these carriers listed above, it has been found particularly useful for bismuth phosphate carrier precipitation. Bismuth phosphate carries tetravalent plutonium, but it does not carry the hexavalent plutonium. The fission product values are partly carriable and partly not. These facts form the basis for a process preferably used in the separation of the compounds of dissolver solutions by carrier precipitation. The fundamentals of one embodiment of a carrier precipitation process will now be described.

A dissolver solution obtained by dissolving neutron-irradiated uranium in nitric acid, or a mixture of nitric acid and sulfuric acid, contains hexavalent uranium, tetravalent plutonium and fission product values. Soluble bismuth and phosphate ion-containing substances, for instance bismuth nitrate and phosphoric acid, are added to the solution whereby a bismuth phosphate carrier precipitate forms which carries the tetravalent plutonium values and part of the fission product values, while the hexavalent uranium values remain in solution with the remainder of the fission product values. In order to reduce the radioactivity of the precipitate by the fission products, a so-called hold-back carrier is advantageously added with, or prior to, the carrier. This hold-back carrier is a compound of a nonradioactive isotope of one or several of the carriable fission product elements. Due to the presence of macro quantities of the hold-back carrier, the fission product values coprecipitated with the tetravalent plutonium are predominantly the nonradioactive ones, while a considerable part of the radioactive fission product values remains in the solution together with the hexavalent uranium. Satisfactory hold-back carriers are salts of lanthanum, cerium(III), barium and zirconium.

The carrier precipitates obtained with or without a hold-back carrier are then separated from the solution, for instance, by filtration, decantation or centrifugation and dissolved in concentrated nitric acid. The plutonium is then converted to the noncarriable hexavalent state by adding an oxidizing agent, such as potassium dichromate or sodium bismuthate.

This oxidized solution is then treated for carrier precipitation. Since sufficient bismuth and phosphate ions are still present from the first precipitate, the addition of a carrier is not necessary, and precipitation may be accomplished by merely diluting the solution with water whereby the acidity is reduced. However, it is optional to add phosphoric acid in order to insure complete precipitation.

This bismuth phosphate precipitate obtained by dilution does not carry plutonium, since the plutonium was present in the noncarriable hexavalent state. Thus, the bismuth phosphate carries only the fission product values of the first precipitate and the hold-back carrier. The supernatant, which contains the plutonium and a relatively small amount of fission products, part of which only is radioactive due to the presence of inactive isotope introduced as the hold-back carrier, is then separated from the precipitate.

The plutonium in this separated solution is reduced to bring it back into the carriable state. Ferrous ions, hydrogen peroxide, and sulfur dioxide, for instance, are suitable reducing agents for this purpose. To the reduced solution bismuth and phosphate ions are again added whereby a precipitate is obtained which carries the tetravalent plutonium while the bulk of the fission product values remains in solution.

This is one embodiment of the process as it has been used heretofore. Separation, however, was not complete so that a repetition of the entire cycle for further decontamination or separation was often considered necessary.

It has now been found that this process, or other similar carrier precipitation processes, can furthermore be improved and that in particular a higher degree of separation can be obtained by carrying out the precipitation of the oxidized solution in the presence of one or several of the scavenging substances, zirconium phosphate, columbic oxide, and lanthanum fluoride which co-precipitate with the carrier, so that a mixture of the scavenger plus carrier precipitates actually is present for the removal of the fission product values from the solution. Such a mixed carrier precipitate carries a considerably higher proportion of the fission products present than the total of the carrier components so that a better separation is obtained in this step and also a higher overall efficiency is brought about which makes repetition of the cycle unnecessary for most purposes.

It is believed that the greatly increased factor of decontamination obtained by the use of one or several of the above-mentioned scavengers is due to a combination of several factors, namely, due to the surface adsorption of radioactive fission product ions, to an exchange reaction whereby the radioactive fission product cations replace the cations of the scavengers thus carrying the radioactive ions out of solution, and also due to incorporation of the radioactive fission product ions into the crystal lattice of the carrier. It will be seen that the last factor is only pertinent where the scavengers are formed in the solution. Formation of the scavengers in the solution from substances containing the ions of the scavengers is therefore the preferred method, although addition of the insoluble scavenger compounds has also given satisfactory results.

The quantity of the scavengers may vary widely, but an amount of from 0.05 to 2.5 g./liter of solution proved preferable, a quantity of about 1.5 g./liter of solution giving the best results.

Precipitation at room temperature is satisfactory, but better results are obtained at slightly elevated temperature up to below the boiling point of the solution. Heating to from 40° to 60° C. for from ten to ninety, preferably thirty to sixty, minutes was found satisfactory.

In the following, a number of examples are given with the intention to illustrate the efficiency of the process of this invention without limiting the invention to the details given therein.

EXAMPLE I

Two parallel experiments were carried out with a bismuth phosphate precipitation from lanthanide rare earth values-containing solutions; the conditions in both instances were identical with the exception that the precipitation of the second test was carried out in the presence of a lanthanum fluoride scavenger. While in the test without the scavenger the bismuth phosphate carried 10% of the rare earth metal values initially present in the solution, substantially all of the rare earth values were carried when the lanthanum fluoride scavenger was used.

EXAMPLE II

Into a solution containing tellurium values, one of the fission products, bismuth and phosphate ions were incorporated; the precipitate formed was found to carry 5% of the tellurium present. The same experiment was repeated with the exception that columbic oxide was used as a scavenger; in this instance, about 60% of the tellurium originally present was carried by the bismuth phosphate-scavenger precipitate mixture.

EXAMPLE III

Two liters of a solution were used obtained by dissolving in hot nitric acid 460 grams of neutron-bombarded uranyl nitrate (aged for twenty-five days after bombardment); the concentration of the solution in nitric acid was 0.1 N. In order to prevent oxidation of Pu(IV) by hot nitric acid, formic acid had been added to the nitric acid in a quantity to obtain a concentration of 0.15 M in the solution. To this solution, which had a temperature of about 85° C., phosphoric acid to yield a concentration of about 0.8 M and bismuth nitrate in a quantity of 2.5 grams per liter of solution were added whereby a bismuth phosphate carrier precipitate formed. This precipitate, which contained the plutonium and the $BiPO_4$-carriable fission product values, was "digested" at about 85° C. for approximately two hours and then separated from the solution; it was then dissolved in 200 ml. of 10 N nitric acid to give a stock solution for the two parallel tests described below. A small nitric acid-insoluble residue (150 counts/min. of $\gamma/5$ ml.) was removed by centrifugation.

The plutonium contained in the stock solution was oxidized to the hexavalent state by adding a 10% slurry of sodium bismuthate in water whereby the solution was diluted to a concentration of 5 M nitric acid; this solution was held at 50° C. for one hour. A five-ml. aliquot of the thus treated stock solution was used for each test for further processing; in one instance precipitation was carried out without a scavenger as a control test, while in the other test a lanthanum fluoride scavenger was used.

The scavenger precipitate was formed in the hot aliquot by adding lanthanum nitrate and then anhydrous hydrogen fluoride. Each solution was then diluted five-fold with water, made 0.1 M in phosphoric acid whereby a bismuth phosphate carrier precipitate was formed; the solution containing the combined scavenger and carrier precipitate was digested for one hour at 75° C. The quantity of precipitate formed corresponded to a ratio of about 500 mg. of scavenger-carrier precipitate per liter of 1 N nitric acid solution, and the lanthanum fluoride was present in a concentration of 0.1 M. The precipitate containing the bismuth phosphate-carriable fission products ("oxidation precipitate") were separated from the solutions by centrifugation, and gamma counts were made.

The solution, which contained the oxidized plutonium values and the bismuth phosphate-noncarriable fission products, in each instance, was then contacted with a 20% solution of ferrous ammonium sulfate in a quantity to yield a $Fe^{++}$ concentration of 0.04 M and heated to 75° C. whereby the plutonium present was reduced to the tetravalent state. A carrier precipitate was then formed ("reduction precipitate") by adding a 24% solution of bismuth subnitrate in a 20% nitric acid, agitating the mixture obtained at 75° C. for thirty minutes, furthermore adding a 75% phosphoric acid and again agitating the solution at 75° C. for about two hours. The reduction precipitate formed was separated by centrifugation, and gamma counts were made on it and also on the solution ("waste liquor") from which the reduction precipitate had been separated. The results of the two experiments are given in the table below.

Table

|                      | Control | LaF₃  |
|----------------------|---------|-------|
| Stock solution       | 1,800   | 1,800 |
| Oxidation precipitate| 605     | 1,670 |
| Reduction precipitate| 49      | 63    |
| Waste liquor         | 1,100   | 580   |
| Accounted for        | 1,754   | 2,313 |

These experiments illustrate that a better decontamination is obtained when a scavenger compound is used.

While the process of this invention has been illustrated with the bismuth phosphate process, which depends on changes in valence of the plutonium ion between the +4 and +6 states and the use of bismuth prosphate as the main carrier precipitate, the application of this invention is not limited to this process. Thus it may be used with processes employing such carriers as the fluorides of lanthanum, cerium, and other lanthanide rare earths, thorium iodate, and thorium oxalate. This process is also applicable to separation processes based upon the changes in solubilities of plutonium in the +3 and +4 valence states, or in the +3 and +6 valence states. Thus, since the process of this invention may be used in such a wide variety of separation processes, it will be seen that it will have a broad application as an improvement on various existing processes, since it can be used to great advantage with any separation process employing a carrier precipitation step.

It will also be understood that this invention is not to be limited to the details given herein, but that it may be modified within the scope of the appended claims.

What is claimed is:

1. In a process for separating fission product values from aqueous mineral acid solutions containing fission product and plutonium (VI) values by carrier precipitation, the improvement which comprises incorporating at least one other compound selected from the group consisting of zirconium phosphate, columbic oxide and lanthanum fluoride into said aqueous solution in a quantity to yield a concentration of about 1.5 grams per liter; adding bismuth ions and phosphate ions to said solution whereby a mixed precipitate of bismuth phosphate and said other compound forms and carries said fission product values while said hexavalent plutonium values remain in solution; and separating said mixed precipitate from said solution.

2. In a process for separating fission product values from aqueous mineral acid solutions containing fission product and plutonium (VI) values by carrier precipitation, the improvement which comprises incorporating at least one scavenger compound selected from the group consisting of zirconium phosphate, columbic oxide and lanthanum fluoride into said aqueous solution in a quantity to yield a concentration of between 0.05 and 2.5 grams per liter; adding bismuth and phosphate ions whereby a mixed precipitate of bismuth phosphate and said scavenger compound forms and carries said fission product values while said hexavalent plutonium values remain in solution; and separating said mixed precipitate from said solution.

3. The process of claim 2 wherein the mineral acid is nitric acid.

4. The process of claim 2 wherein the carrier precipitation is carried out by maintaining the solution at from 40° to 60° C. for from ten to ninety minutes.

5. The process of claim 2 wherein the scavenger is zirconium phosphate.

6. The process of claim 2 wherein the scavenger is columbic oxide.

7. The process of claim 2 wherein the scavenger is lanthanum fluoride.

8. A process for separating plutonium (IV) values, fission product values and uranyl values from aqueous nitric acid solutions, which comprises adding bismuth and phosphate ions to said solution whereby a carrier precipitate is incorporated which carries said plutonium values and part of said fission product values while uranyl values and the remainder of the fission product values remain in solution; separating said carrier precipitate from said solution; dissolving said carrier precipitate in nitric acid; adding an oxidizing agent to the nitric acid solution obtained whereby said plutonium (IV) values are converted to plutonyl values; adding from 0.05 to 2.5 grams per liter of a scavenger to said oxidized solution, said scavenger being selected from the group consisting of zirconium phosphate, columbic oxide and lanthanum fluoride; diluting said oxidized solution with water whereby bismuth phosphate precipitates and a mixed carrier precipitate forms with said scavenger, said mixed precipitate carrying the bulk of said fission product values while the plutonyl values and a minor part of said fission product values remain in solution; separating said fission products-carrying mixed precipitate from said plutonyl solution; adding a reducing agent to said plutonyl solution whereby plutonium (VI) is converted to plutonium (IV); adding bismuth and phosphate ions to said plutonium (IV) solution whereby bismuth phosphate precipitates which carries said plutonium (IV) values while the minor part of said fission product values remain in solution; and separating said bismuth phosphate carrying said plutonium (IV) values from said fission products-containing solution.

9. In a process for separating rare earth metal values from aqueous mineral acid solutions by carrier precipitation, the improvement which comprises incorporating at least one scavenger compound selected from the group consisting of zirconium phosphate, columbic oxide and lanthanum fluoride into said aqueous solution in a quantity to yield a concentration of between 0.05 and 2.5 grams per liter, adding bismuth and phosphate ions whereby a mixed precipitate of bismuth phosphate and said scavenger compound forms and carries said rare earth metal values, and separating said mixed precipitate from said solution.

References Cited in the file of this patent
UNITED STATES PATENTS

| 2,776,185 | Werner et al. | Jan. 1, 1957 |
| 2,785,951 | Thompson et al. | Mar. 19, 1957 |
| 2,823,978 | Sutton | Feb. 18, 1958 |

OTHER REFERENCES

Seaborg et al.: The Transuranium Elements, pp. 51–78 (1949). Pub. by McGraw-Hill, N.Y., as IV–14–B of the National Nuclear Energy Series.